United States Patent
Maki et al.

(10) Patent No.: US 9,254,617 B2
(45) Date of Patent: Feb. 9, 2016

(54) METHOD AND APPARATUS FOR FORMING AND FILLING A CONTAINER

(71) Applicant: AMCOR LIMITED, Hawthorn (AU)

(72) Inventors: Kirk Edward Maki, Tecumseh, MI (US); George David Lisch, Jackson, MI (US); Bradley Wilson, Manchester, MI (US)

(73) Assignee: DISCMA AG, Hunenberg (CH)

( * ) Notice: Subject to any disclaimer, the term of this patent is extended or adjusted under 35 U.S.C. 154(b) by 372 days.

(21) Appl. No.: 13/661,262

(22) Filed: Oct. 26, 2012

(65) Prior Publication Data

US 2013/0106027 A1 May 2, 2013

Related U.S. Application Data

(60) Provisional application No. 61/552,067, filed on Oct. 27, 2011.

(51) Int. Cl.
*B29C 49/46* (2006.01)
*B29C 49/12* (2006.01)
*B29D 22/00* (2006.01)
(Continued)

(52) U.S. Cl.
CPC ............. *B29D 22/003* (2013.01); *B29C 49/12* (2013.01); *B29C 49/46* (2013.01); *B29C 49/58* (2013.01); *B29C 49/78* (2013.01); *B29C 49/06* (2013.01); *B29C 49/783* (2013.01); *B29C 49/786* (2013.01); *B29C 2049/1228* (2013.01); *B29C 2049/1238* (2013.01); *B29C 2049/1261* (2013.01);
(Continued)

(58) Field of Classification Search
CPC .............. B29C 49/46; B29C 2049/465; B29C 2049/4652; B29C 2049/4655; B29C 2049/4664; B29C 2049/1238
See application file for complete search history.

(56) References Cited

U.S. PATENT DOCUMENTS 3,267,185 A 8/1966 Freeman, Jr.
3,268,635 A 8/1966 Kraus et al.
(Continued)

FOREIGN PATENT DOCUMENTS

EP 0379264 7/1990
EP 0445465 11/1990
(Continued)

OTHER PUBLICATIONS

International Search Report and Written Opinion dated Mar. 22, 2013 in corresponding International Patent Application No. PCT/US2012/062201 (eleven pages).

*Primary Examiner* — Robert B Davis
(74) *Attorney, Agent, or Firm* — Eric J. Sosenko; Jonathan P. O'Brien; Honigman Miller Schwartz and Cohn LLP

(57) ABSTRACT

A system for simultaneously forming and filling a container having a mold cavity defining an internal surface and adapted to accept a preform. The system includes a servo pressure system having an inlet and an outlet operable to output fluid, such as a liquid commodity, and a blow nozzle receiving the fluid from the servo pressure source and transferring the fluid at a pressure into the preform thereby urging the preform to expand toward the internal surface of the mold cavity and creating a resultant container, wherein the fluid remains within the container as an end product and wherein the servo pressure system and the blow nozzle output the fluid at a rate sufficient to fully form and fill the container in less than about 0.5 seconds.

57 Claims, 5 Drawing Sheets

(51) Int. Cl.
  *B29C 49/58* (2006.01)
  *B29C 49/78* (2006.01)
  *B29L 31/00* (2006.01)
  *B29K 67/00* (2006.01)
  *B29C 49/06* (2006.01)

(52) U.S. Cl.
  CPC ... *B29C2049/4664* (2013.01); *B29K 2067/003* (2013.01); *B29L 2031/7158* (2013.01)

(56) References Cited

U.S. PATENT DOCUMENTS

| | | | |
|---|---|---|---|
| 3,993,427 A | 11/1976 | Kauffman et al. | |
| 4,039,641 A | 8/1977 | Collins | |
| 4,177,239 A | 12/1979 | Gittner et al. | |
| 4,321,938 A | 3/1982 | Siller | |
| 4,432,720 A | 2/1984 | Wiatt et al. | |
| 4,457,688 A | 7/1984 | Calvert et al. | |
| 4,490,327 A | 12/1984 | Calvert et al. | |
| 4,499,045 A | 2/1985 | Obsomer | |
| 4,524,045 A * | 6/1985 | Hayashi et al. | 264/521 |
| 4,539,172 A | 9/1985 | Winchell et al. | |
| 4,725,464 A | 2/1988 | Collette | |
| 4,883,631 A | 11/1989 | Ajmera | |
| 4,935,190 A | 6/1990 | Tennerstedt | |
| 4,952,134 A | 8/1990 | Bartley et al. | |
| 5,129,815 A | 7/1992 | Miyazawa et al. | |
| 5,269,672 A | 12/1993 | DiGangi, Jr. | |
| 5,290,506 A * | 3/1994 | Yokobayashi | 264/520 |
| 5,344,596 A | 9/1994 | Hendry | |
| 5,389,332 A | 2/1995 | Amari et al. | |
| 5,403,538 A | 4/1995 | Maeda | |
| 5,486,103 A | 1/1996 | Meiring et al. | |
| 5,540,879 A | 7/1996 | Orimoto et al. | |
| 5,599,496 A | 2/1997 | Krishnakumar et al. | |
| 5,614,148 A * | 3/1997 | Beck et al. | 264/532 |
| 5,622,735 A | 4/1997 | Krishnakumar et al. | |
| 5,635,226 A | 6/1997 | Koda et al. | |
| 5,687,550 A | 11/1997 | Hansen et al. | |
| 5,824,237 A | 10/1998 | Stumpf et al. | |
| 5,962,039 A | 10/1999 | Katou et al. | |
| 6,214,282 B1 | 4/2001 | Katou et al. | |
| 6,277,321 B1 | 8/2001 | Vailliencourt et al. | |
| 6,428,735 B1 * | 8/2002 | Deemer et al. | 264/454 |
| 6,485,670 B1 | 11/2002 | Boyd et al. | |
| 6,502,369 B1 | 1/2003 | Andison et al. | |
| 6,692,684 B1 | 2/2004 | Nantin et al. | |
| 6,729,868 B1 | 5/2004 | Vogel et al. | |
| 6,749,415 B2 | 6/2004 | Boyd et al. | |
| 6,767,197 B2 | 7/2004 | Boyd et al. | |
| 7,141,190 B2 | 11/2006 | Hekal | |
| 7,473,388 B2 | 1/2009 | Desanaux et al. | |
| 7,553,441 B2 | 6/2009 | Shi | |
| 7,658,882 B2 | 2/2010 | Minganti | |
| 7,862,327 B2 | 1/2011 | Rousseau et al. | |
| 7,914,726 B2 | 3/2011 | Andison et al. | |
| 7,981,356 B2 | 7/2011 | Warner et al. | |
| 8,017,064 B2 | 9/2011 | Andison et al. | |
| 8,096,483 B2 | 1/2012 | Riney | |
| 8,435,026 B2 | 5/2013 | Andison et al. | |
| 8,573,964 B2 * | 11/2013 | Andison et al. | 425/524 |
| 2001/0010145 A1 | 8/2001 | Tawa et al. | |
| 2004/0070119 A1 | 4/2004 | Fibbia et al. | |
| 2005/0067002 A1 | 3/2005 | Jones | |
| 2005/0098527 A1 | 5/2005 | Yates, III | |
| 2005/0206045 A1 | 9/2005 | Desanaux et al. | |
| 2006/0097417 A1 | 5/2006 | Emmer | |
| 2006/0231646 A1 | 10/2006 | Geary, Jr. | |
| 2008/0271812 A1 | 11/2008 | Stefanello et al. | |
| 2010/0084493 A1 | 4/2010 | Troudt | |
| 2010/0213629 A1 | 8/2010 | Adriansens | |
| 2010/0303903 A1 | 12/2010 | Voth | |
| 2011/0135778 A1 * | 6/2011 | Andison et al. | 425/524 |
| 2011/0265433 A1 | 11/2011 | Chauvin et al. | |

FOREIGN PATENT DOCUMENTS

| | | |
|---|---|---|
| EP | 0849514 | 6/1998 |
| EP | 1529620 | 5/2005 |
| EP | 1577258 | 9/2005 |
| EP | 1688234 | 8/2006 |
| FR | 2887525 | 12/2006 |
| JP | 57123027 | 7/1982 |
| JP | 63-249616 | 10/1988 |
| JP | 08-197563 | 8/1996 |
| JP | 09-011325 | 1/1997 |
| JP | 09057834 | 3/1997 |
| JP | 09099477 | 4/1997 |
| JP | 10-217258 | 8/1998 |
| JP | 2000-043129 | 2/2000 |
| JP | 2000-043130 | 2/2000 |
| JP | 2000-167195 | 6/2000 |
| JP | 2002-067131 | 3/2002 |
| JP | 2003-053823 | 2/2003 |
| JP | 2005-067002 | 3/2005 |
| JP | 2005-254704 | 9/2005 |
| JP | 2009-045876 | 3/2009 |
| JP | 2005-529002 | 9/2009 |
| KR | 10-0147442 | 8/1998 |
| KR | 2006-0105883 | 10/2006 |
| KR | 2006-0128062 | 12/2006 |
| WO | WO 02/24435 | 3/2002 |
| WO | WO 03/095179 | 11/2003 |
| WO | WO 2004/065105 | 8/2004 |
| WO | WO 2005/044540 | 5/2005 |
| WO | WO 2007/120807 | 10/2007 |
| WO | WO 2008/129013 | 10/2008 |

* cited by examiner

METHOD AND APPARATUS FOR FORMING AND FILLING A CONTAINER

CROSS-REFERENCE TO RELATED APPLICATIONS

This application claims the benefit of U.S. Provisional Application No. 61/552,067, filed on Oct. 27, 2011. The entire disclosure of the above application is incorporated herein by reference.

FIELD

This disclosure generally relates to forming and filling a plastic container. More specifically, this disclosure relates to an apparatus and method for forming rapidly and simultaneously forming and filling a plastic container.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc). Once a container has been blown, a commodity may be filled into the container.

Traditionally blow molding and filling have developed as two independent processes, in many cases operated by different companies. In order to make bottle filling more cost effective, some fillers have moved blow molding in house, in many cases integrating blow molders directly into their filling lines. The equipment manufacturers have recognized this advantage and are selling "integrated" systems that are designed to insure that the blow molder and the filler are fully synchronized. Despite the efforts in bringing the two processes closer together, blow molding and filling continue to be two independent, distinct processes. As a result, significant costs may be incurred while performing these two processes separately. Thus, there is a need for a liquid or hydraulic blow molding system suitable for forming and filling a container in a single operation. Moreover, there is a need for a modified preform that is particularly well-suited for molding system that form and fill a container in a single operation

SUMMARY

This section provides a general summary of the disclosure, and is not a comprehensive disclosure of its full scope or all of its features.

Accordingly, the present disclosure teaches a system for simultaneously forming and filling a container having a mold cavity defining an internal surface and adapted to accept a preform. The system includes a servo pressure system having an inlet and an outlet operable to output fluid, such as a liquid commodity, and a blow nozzle receiving the fluid from the servo pressure source and transferring the fluid at a pressure into the preform thereby urging the preform to expand toward the internal surface of the mold cavity and creating a resultant container, wherein the fluid remains within the container as an end product and wherein the servo pressure system and the blow nozzle output the fluid at a rate sufficient to fully form and fill the container in less than about 0.5 seconds.

In some embodiments, a system is provided for simultaneously forming and filling a container comprising: a mold cavity defining an internal surface and adapted to accept a preform; a servo pressure system having an inlet and an outlet, the servo pressure system outputting fluid; and a blow nozzle receiving the fluid from the servo pressure source and transferring the fluid at a pressure into an opening of the preform thereby urging the preform to expand toward the internal surface of the mold cavity and creating a resultant container, wherein the fluid remains within the container as an end product, wherein the servo pressure system and the blow nozzle output the fluid at a rate sufficient to fully form and fill the container in less than about 0.5 seconds.

In some embodiments, the servo pressure system comprises: a controller; a servo motor operably coupled to the controller; and a fluid path extending from the inlet to the outlet, wherein the servo motor is operable to deliver the fluid at a variable rate along the fluid path within a predetermined period of time.

In some embodiments, a minimum inner diameter of the fluid path is greater than a minimum inner diameter of the preform.

In some embodiments, the fluid path defines a straight path from the inlet to the outlet.

In some embodiments, the fluid path is void of angles 90 degrees and greater.

In some embodiments, the servo pressure system and the blow nozzle output the fluid at a rate sufficient to fully form and fill the container in less than about 0.4 seconds.

In some embodiments, the servo pressure system and the blow nozzle output the fluid at a rate sufficient to fully form and fill the container in less than about 0.2 seconds.

In some embodiments, the servo pressure system and the blow nozzle output the fluid at a rate sufficient to fully form and fill the container in the range of about 0.05 seconds to about 0.15 seconds.

In some embodiments, the servo pressure system and the blow nozzle output the fluid at a rate sufficient to fully form and fill the container having a capacity of 64 ounces in less than about 0.4 seconds.

In some embodiments, the servo pressure system and the blow nozzle output the fluid at a rate sufficient to fully form and fill the container having a capacity of 16 ounces in less than about 0.4 seconds.

In some embodiments, the blow nozzle defines a shape adapted to form a seal with a finish of the preform.

In some embodiments, the fluid is transferred into the preform during a hot-fill process.

In some embodiments, the fluid is transferred into the preform at a temperature between approximately 185° F. (85° C.) and approximately 205° F. (96° C.).

In some embodiments, the fluid is transferred into the preform at an ambient temperature.

In some embodiments, the fluid is transferred into the preform at a temperature between approximately 32° F. (0° C.) and approximately 90° F. (32° C.).

In some embodiments, the mold cavity accepts a preform heated to a temperature between approximately 190° F. (88° C.) and approximately 250° F. (121° C.).

In some embodiments, the mold cavity is heated to a temperature between approximately 250° F. (93° C.) and approximately 350° F. (177° C.).

In some embodiments, the fluid is transferred into the preform at a pressure between approximately 100 PSI and approximately 600 PSI.

In some embodiments, the system further comprises a stretch rod adapted to extend into the container and displace the fluid remaining in the container to define a predetermined final fill level.

In some embodiments, the system further comprises a stretch rod adapted to extend into the preform and displace air contained in the preform prior to the blow nozzle transferring the fluid into the preform.

In some embodiments, the system further comprises a stretch rod adapted to extend into the preform and mechanically stretch the preform prior to the fluid being urged into the preform.

In some embodiments, the stretch rod is sized to permit the mechanical stretching and to maintain open at least 77% or more of the cross-sectional area of the opening of the preform while the stretch rod is extended into the preform.

In some embodiments, the stretch rod is retracted from the preform prior to the fluid being urged into the preform.

In some embodiments, the stretch rod is vented to atmosphere.

In some embodiments, the stretch rod is non-cylindrical.

In some embodiments, the stretch rod comprises one or more cutouts.

In some embodiments, the stretch rod comprises an inwardly directed arcuate section.

In some embodiments, the stretch rod comprises at least one cutout extending spirally along a longitudinal direction of the stretch rod.

In some embodiments, the stretch rod defines an annulus exterior of the stretch rod to permit flow of the fluid.

In some embodiments, the stretch rod defines an annulus exterior of the stretch rod to permit flow of the fluid and a bore extending through at least a portion of the stretch rod to further permit flow of the fluid.

In some embodiments, the preform is initially expanded outwardly under a first pressure and subsequently expanded outwardly under a second pressure, the second pressure being greater than the first pressure.

In some embodiments, the first pressure is between approximately 100 PSI and approximately 150 PSI, and the second pressure is between approximately 500 PSI and approximately 600 PSI.

In some embodiments, a method of simultaneously forming and filling a container is provided comprising: placing a preform into a mold cavity of a mold, the preform having an internal volume, the mold cavity having an internal surface; and transferring a fluid via a servo motor system at a pressure into an opening of the preform thereby urging the preform to expand toward the internal surface of the mold cavity and creating a resultant container in less than about 0.5 seconds, the fluid remaining within the container as an end product.

In some embodiments, the transferring a fluid via a servo motor system at a pressure into an opening of the preform comprises: providing a controller; and actuating a servo motor in response to the controller such that the fluid is urged into the preform at a variable rate within a predetermined period of time along a fluid path.

In some embodiments, the transferring a fluid via a servo motor system at a pressure into an opening of the preform comprises: providing a controller; and actuating a servo motor in response to the controller such that the fluid is urged into the preform at a variable rate within a predetermined period of time along a fluid path, wherein a minimum inner diameter of the fluid path is greater than a minimum inner diameter of the preform.

In some embodiments, the transferring a fluid via a servo motor system at a pressure into an opening of the preform comprises: providing a controller; and actuating a servo motor in response to the controller such that the fluid is urged into the preform at a variable rate within a predetermined period of time along a fluid path, wherein the fluid path extends from an input of the servo motor system to an output of the servo motor system and the fluid path is substantially straight.

In some embodiments, the step of transferring a fluid via a servo motor system at a pressure into an opening of the preform thereby urging the preform to expand toward the internal surface of the mold cavity and creating a resultant container in less than about 0.5 seconds comprises transferring the fluid via the servo motor system at the pressure into the opening of the preform thereby urging the preform to expand toward the internal surface of the mold cavity and creating the resultant container in less than about 0.4 seconds.

In some embodiments, the step of transferring a fluid via a servo motor system at a pressure into an opening of the preform thereby urging the preform to expand toward the internal surface of the mold cavity and creating a resultant container in less than about 0.5 seconds comprises transferring the fluid via the servo motor system at the pressure into the opening of the preform thereby urging the preform to expand toward the internal surface of the mold cavity and creating the resultant container in less than about 0.2 seconds.

In some embodiments, the step of transferring a fluid via a servo motor system at a pressure into an opening of the preform thereby urging the preform to expand toward the internal surface of the mold cavity and creating a resultant container in less than about 0.5 seconds comprises transferring the fluid via the servo motor system at the pressure into the opening of the preform thereby urging the preform to expand toward the internal surface of the mold cavity and creating the resultant container in the range of about 0.05 seconds to about 0.15 seconds.

In some embodiments, the step of transferring a fluid via a servo motor system at a pressure into an opening of the preform thereby urging the preform to expand toward the internal surface of the mold cavity and creating a resultant container in less than about 0.5 seconds comprises transferring the fluid via the servo motor system at the pressure into the opening of the preform thereby urging the preform to expand toward the internal surface of the mold cavity and creating the resultant container having a capacity of about 64 ounces in less than about 0.4 seconds.

In some embodiments, the step of transferring a fluid via a servo motor system at a pressure into an opening of the preform thereby urging the preform to expand toward the internal surface of the mold cavity and creating a resultant container in less than about 0.5 seconds comprises transferring the fluid via the servo motor system at the pressure into the opening of the preform thereby urging the preform to expand toward the internal surface of the mold cavity and creating the resultant container having a capacity of about 16 ounces in less than about 0.4 seconds.

In some embodiments, the step of transferring a fluid via a servo motor system at a pressure into an opening of the preform thereby urging the preform to expand toward the internal surface of the mold cavity and creating a resultant container in less than about 0.5 seconds comprises transferring the fluid as a hot-fill process.

In some embodiments, the step of transferring a fluid via a servo motor system at a pressure into an opening of the preform thereby urging the preform to expand toward the internal surface of the mold cavity and creating a resultant container in less than about 0.5 seconds comprises transferring the fluid at a temperature between approximately 185° F. (85° C.) and approximately 205° F. (96° C.).

In some embodiments, the step of transferring a fluid via a servo motor system at a pressure into an opening of the preform thereby urging the preform to expand toward the internal surface of the mold cavity and creating a resultant container in less than about 0.5 seconds comprises transferring the fluid at ambient temperature.

In some embodiments, the step of transferring a fluid via a servo motor system at a pressure into an opening of the preform thereby urging the preform to expand toward the internal surface of the mold cavity and creating a resultant container in less than about 0.5 seconds comprises transferring the fluid at a temperature between approximately 32° F. (0° C.) and approximately 90° F. (32° C.).

In some embodiments, the step of placing a preform into a mold cavity of a mold comprises heating the preform to a temperature between approximately 190° F. (88° C.) and approximately 250° F. (121° C.) and placing the preform into the mold cavity of the mold.

In some embodiments, the step of transferring a fluid via a servo motor system at a pressure into an opening of the preform thereby urging the preform to expand toward the internal surface of the mold cavity and creating a resultant container in less than about 0.5 seconds comprises transferring the fluid into the preform at a pressure between approximately 100 PSI and approximately 600 PSI.

In some embodiments, the method further comprises extending a stretch rod into the resultant container and displacing the fluid remaining in the resultant container to define a predetermined final fill level.

In some embodiments, the method further comprises extending a stretch rod into the preform and displacing air contained within the preform prior to the step of transferring the fluid via the servo motor system at the pressure into the opening of the preform.

In some embodiments, the method further comprises extending a stretch rod into the preform and mechanically stretching the preform prior to the step of transferring the fluid via the servo motor system at the pressure into the opening of the preform.

In some embodiments, the method further comprises extending a stretch rod into the preform and mechanically stretching the preform; and retracting the stretch rod from the preform prior to the step of transferring the fluid via the servo motor system at the pressure into the opening of the preform.

In some embodiments, the method further comprise extending a stretch rod into the preform and mechanically stretching the preform prior to the step of transferring the fluid via the servo motor system at the pressure into the opening of the preform, the stretch rod being sized to maintain open at least 77% or more of the cross-sectional area of an opening of the preform while the stretch rod is extended into the preform.

In some embodiments, the method further comprises extending a stretch rod into the preform and mechanically stretching the preform prior to the step of transferring the fluid via the servo motor system at the pressure into the opening of the preform, the stretch rod being non-cylindrical.

In some embodiments, the method further comprises extending a stretch rod into the preform and mechanically stretching the preform prior to the step of transferring the fluid via the servo motor system at the pressure into the opening of the preform, the stretch rod having one or more cutouts.

In some embodiments, the method further comprises extending a stretch rod into the preform and mechanically stretching the preform prior to the step of transferring the fluid via the servo motor system at the pressure into the opening of the preform, the stretch rod having an inwardly directed arcuate section.

In some embodiments, the method further comprises extending a stretch rod into the preform and mechanically stretching the preform prior to the step of transferring the fluid via the servo motor system at the pressure into the opening of the preform, the stretch rod having at least one cutout extending spirally along a longitudinal direction of the stretch rod.

In some embodiments, the method further comprises extending a stretch rod into the preform and mechanically stretching the preform prior to the step of transferring the fluid via the servo motor system at the pressure into the opening of the preform, the stretch rod having an annulus exterior of the stretch rod to permit flow of the fluid.

In some embodiments, the method further comprises a stretch rod into the preform and mechanically stretching the preform prior to the step of transferring the fluid via the servo motor system at the pressure into the opening of the preform, the stretch rod having an annulus exterior of the stretch rod to permit flow of the fluid and a bore extending through at least a portion of the stretch rod to further permit flow of the fluid.

In some embodiments, the step of transferring a fluid via the servo motor system at the pressure into the opening of the preform comprises transferring the fluid at a first pressure and subsequently at a second pressure, the second pressure being greater than the first pressure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
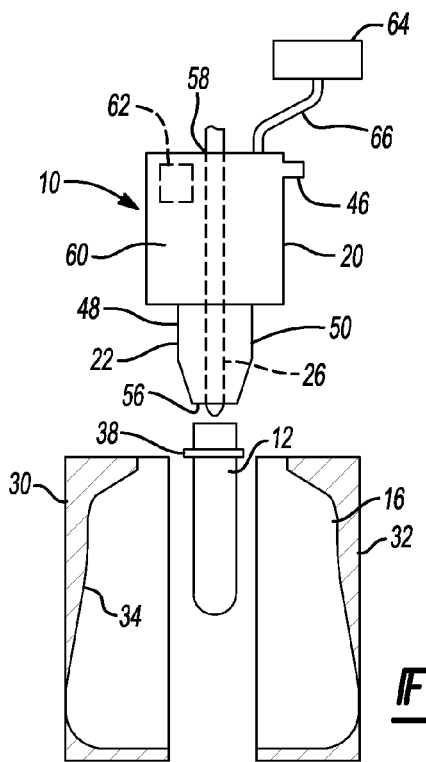
FIG. 1 is a schematic depiction of a heated preform passed into a mold station.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Generally, according to some embodiments of the present teachings, a method and apparatus is provided to permit the forming and filling of a preform at a rate previously not attainable by conventional systems. In some embodiments of the present teachings, a method and apparatus is provided to permit the simultaneous forming and filling of a PET preform in less than about 0.3 seconds. The volume of liquid introduced can be sufficient to completely fill the preform as it is injection molded. By using the final liquid commodity as the forming fluid, a single step forming and filling operation can be achieved.

It has been discovered in the development of a dual purpose forming and filling PET bottling machine that the best container quality is obtained by keeping forming and filling times to a minimum. It has also been found that by increasing the fill velocity to a rate that permits the container to be formed and filled in less than about 0.4 seconds provides enhanced container quality and improved manufacturing efficiencies. Moreover, in some embodiments, it has been found that combined forming and filling durations of about 0.3 seconds to about 0.2 seconds provide even more improved container quality and manufacturing efficiencies. Structurally, it has been found that this rapid forming and filling process of the present teachings results in improved container structures on a crystalline level. Ideally, it has been found that all container sizes appear to benefit from a forming and filling process being within the range of about 0.05 seconds to about 0.15 seconds. The principles of the present teachings combine the benefits of high speed two-step blow molding, with consistent cycle times, with the efficiencies of simultaneous filling the container that results in a single-step, rapidly employed manufacturing system.

Singe-Step Forming and Filling Discussion

Figure 5:
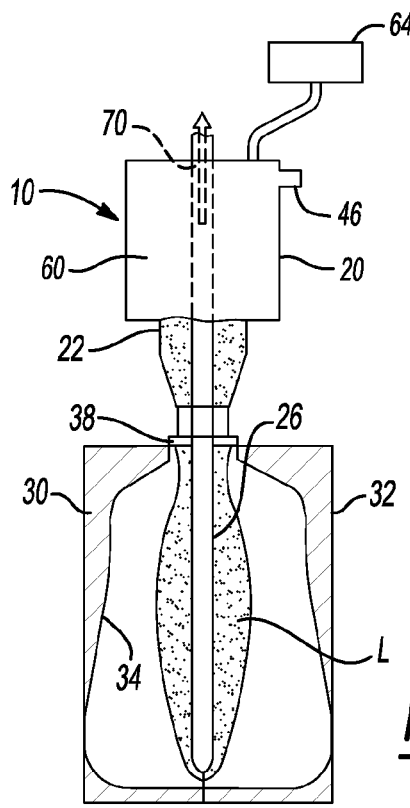
FIG. 5 is a schematic depiction of the system of FIG. 4 wherein the servo pressure source drives the liquid to the preform thereby expanding the preform toward the walls of the mold cavity.
Figure 6:
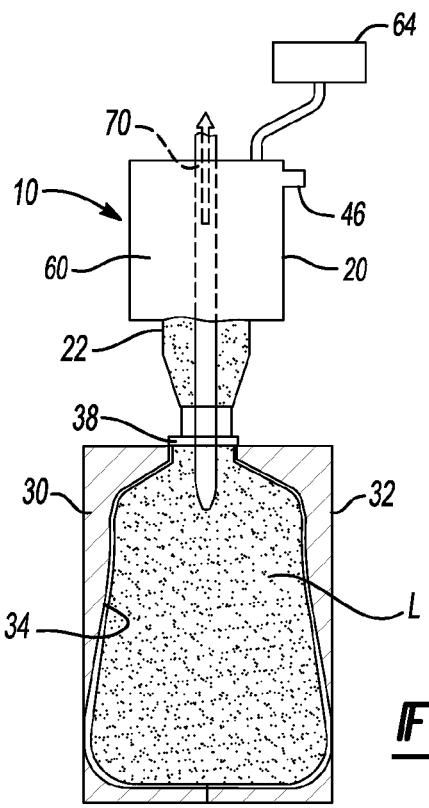
FIG. 6 is a schematic depiction of the system of FIG. 5 wherein the servo pressure source has transferred an appropriate volume of liquid to the newly formed container and wherein the stretch rod is withdrawing.
Figure 7:
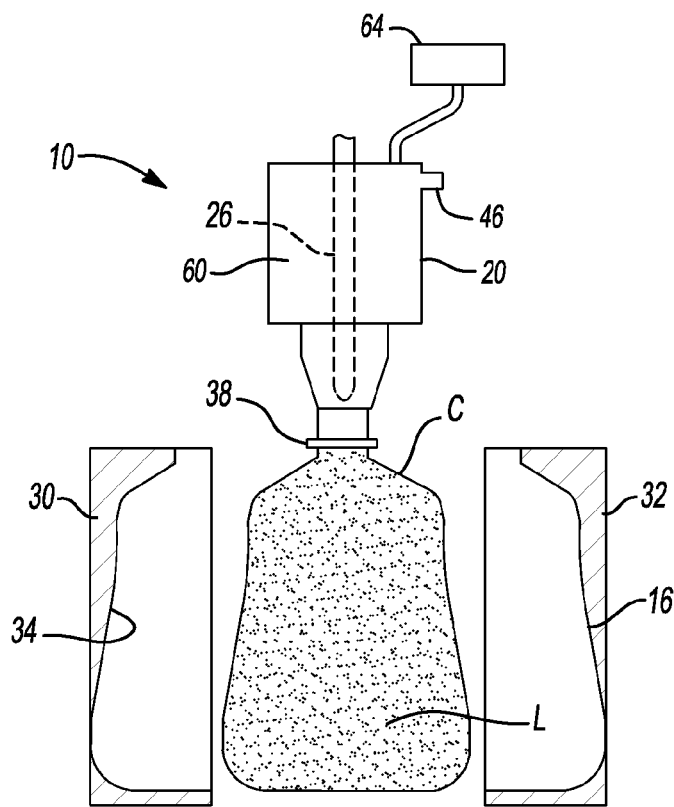
FIG. 7 is a schematic depiction of the system of FIG. 6 wherein the mold halves are separate.

With regard to FIGS. 1-7, a mold station 10 is provided that utilizes a final liquid commodity L to impart the pressure required to expand a hot preform 12 to take on the shape of a mold thus simultaneously forming and filling the resultant container C (FIG. 7).

With initial reference to FIG. 1, the mold station 10 will be described in greater detail. The mold station 10 generally includes a mold cavity 16, a pressure source 20, such as a high speed servo drive unit, a blow nozzle 22 and an optional stretch rod 26. The exemplary mold cavity 16 illustrated includes mold halves 30, 32 that cooperate to define an interior surface 34 corresponding to a desired outer profile of a blown container. The mold cavity 16 may be moveable from an open position (FIG. 1) to a closed position (FIG. 2) such that a support ring 38 of the preform 12 is captured at an upper end of the mold cavity 16.

In one example, the pressure source 20 can be in the form of, but not limited to, a high speed servo drive unit, a filling cylinder, manifold, chamber, or combinations thereof. It should be appreciated that in some embodiments, a movable filling cylinder, manifold, or chamber may not provide sufficient space optimization or facility efficiency. Moreover, in some embodiments, it may be difficult to obtain and/or route pressurized fluid from a first location to the preform shaping location.

Therefore, in some embodiments, the pressure source 20 can be in the form of a servo system 60 that generally includes one or more servo motors 62 being actuated by one or more controllers 64 via a line 66. As will be discussed in greater detail herein, the servo system 60 can be positioned adjacent to the preform shaping location to achieve additional benefits. The servo system 60 can comprise inlet 46 for accepting liquid commodity L and outlet 48 for delivering the liquid commodity L to the blow nozzle 22. It is appreciated that the inlet 46 and the outlet 48 may have valves incorporated thereat. The servo motor 62 may be operable in a first direction to draw liquid commodity L from the inlet 46 and output the liquid commodity L from the outlet 48 to the blow nozzle 22 (i.e. forward flow). The servo motor 62, in some embodiments, may also be operable in a second direction to draw liquid commodity L from outlet 48, blow nozzle 22, and/or preform 12 (i.e. reverse flow), which will be discussed in greater detail herein. The inlet 46 of the pressure source 20 may be connected, such as by tubing or piping to a reservoir or container (not shown) which contains the final liquid commodity L. It is appreciated that the pressure source 20 may be configured differently.

In some embodiments, servo system 60 and any associated filling cylinder can be located generally adjacent to blow nozzle 22. For reasons enumerated herein, by minimizing the flow distance, flow rates and pressures can be maximized. In some embodiments, as illustrated, corners or other restrictions can be minimized or eliminated, including corners, bends, and/or constricting fittings. In fact, in some embodiments, mounting servo system 60 and/or any associated fill cylinder directly to the blow nozzle 22 can provide an ideal configuration. However, this direct mounting configuration is not required as many of the benefits can be achieved by minimizing flow path length and mandrel bends, and maintaining as large as possible inside or inner diameter the entire distance from the servo system 60 and any associated fill cylinder to the blow nozzle 22.

Figure 8:
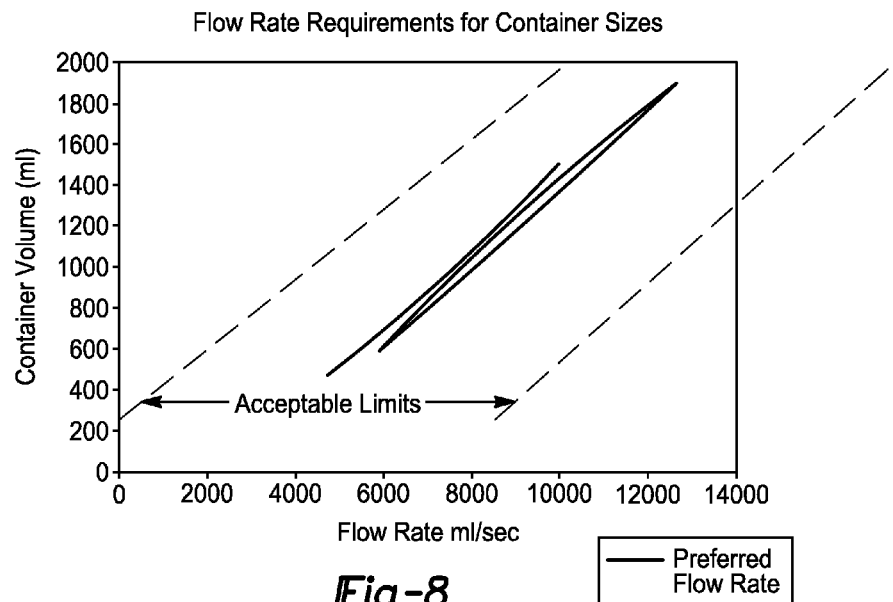
FIG. 8 is a graph illustrating flow rate requirements for various container sizes according to the principles of the present teachings.
Figure 9:
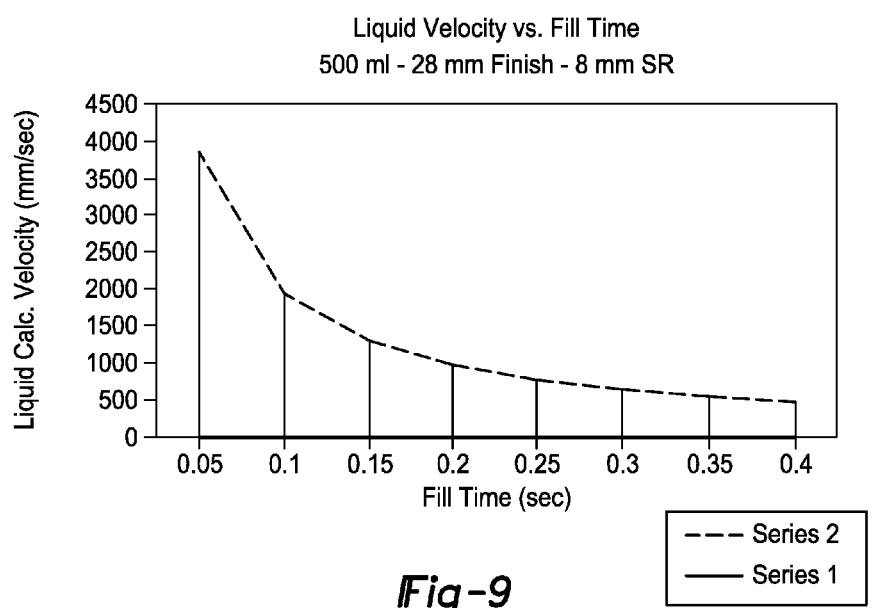
FIG. 9 is a graph illustrating liquid velocity versus fill time for an exemplary 500 mL container having a 28 mm finish using an 8 mm stretch rod according to the principles of the present teachings.

In addition to these mechanical modifications, the servo system 60 and any associated filling cylinder should be sized to output a volume of liquid commodity L required to fully form and fill the container, through the full stroke of the servo, in less than about 0.2 seconds. As illustrated in FIG. 8, flow rate requirements for various container sizes are illustrated. According to FIG. 8, the generally acceptable minimum and maximum flow rate (ml/sec) is provided for various container volumes (ml). Similarly, as illustrated in FIG. 9, liquid velocity versus fill time is illustrated for a 500 ml container having a 28 mm finish and employing an 8 mm stretch rod. It should be understood that servo system 60 can provide flow rates that are variable or selective, and/or operate at variable or selective pressures, within a predetermined amount of time.

In some embodiments, this requires a high speed servo drive unit matched to a filling cylinder. Ideally this is a matched system that can produce pressures of up to about 600 psi while accelerating fast enough to fill a 2 liter container in less than 0.4 seconds with a more desirable fill time of about 0.2 seconds. The servo must have the force capability, coupled to the correct pitch ball screw, and attached to the right sized fill piston cylinder. By way of non-limiting example, the following configuration has been shown to be acceptable in some embodiments: a 400 volt, 6 kW servo motor coupled to a 12 mm pitch ball drive screw and a 6 inch cylinder. Alternatively, the following configuration can be used in some embodiments: a 7.5 kW servo coupled to a 14 mm ball drive and a 5.5 inch cylinder. Consequently, it has been found that the present teachings can be used to form and fill a 16 oz container and a 64 oz container in approximately the same relative time, that is about 0.05-0.4 seconds depending upon the neck finish size and the container geometry.

In some embodiments, servo motor 62 can be used to overcome some of the difficulties in metering precise and/or minute quantities of commodity L. That is, servo motor 62 is precisely and variably controlled to permit precise metering of a through flow of commodity L and at a variable rate. This precise and variably control can be coupled with a feedback loop to provide active and real-time monitoring and control of the fill process, including stopping of the filling process in the event of a detected issue, such as a blow-out. In this way, the feedback loop can be formed as part of controller 64, with appropriate sensors disposed at any one of a number of locations provide sufficient data to detect a relevant parameter (e.g. pressure sensors, flow sensors, shape sensors, and the like). Because active control of the pressures and quantity of flow of commodity L is often important to the final formed product, the use of servo system 60 is particularly well suited to provide such benefits.

It should be recognized that servo system 60 may require less electrical power to operate relative to conventional systems, thereby providing additional benefits in terms of reduced electrical consumption and cost.

The blow nozzle 22 generally defines an inlet 50 for accepting the liquid commodity L from the outlet 48 of the pressure source 20 and an outlet 56 (FIG. 1) for delivering the liquid commodity L into the preform 12. It is appreciated that the outlet 56 may define a shape complementary to the preform 12 near the support ring 38 such that the blow nozzle 22 may easily mate with the preform 12 during the forming/filling process. In embodiments employing a sealing gasket disposed between blow nozzle 22 and preform 12, it should be noted that the sealing gasket should have minimal overlap into the fluid path so it does not hinder the flow of fluid into the preform. This is a critical factor in regards to achieving the best flow path possible. By way of non-limiting example, for a 38 mm finish preform, it is desirable that the minimum sealing gasket ID is 30 mm.

In some embodiments, the blow nozzle 22 and/or pressure source 20 may define an opening 58 for slidably accepting the optional stretch rod 26 used to initiate mechanical stretching of the preform 12 in some embodiments. However, it should be appreciated that stretch rod 26 is not required in all embodiments. In embodiments employing stretch rod 26, a Stretch Rod Withdrawal System (SRWS) can be used that induces stretch into the preform by just beginning to mechanically stretch the preform. Once the stretch is initiated mechanically, the fluid flow of liquid commodity L can begin to fill and form the preform. At this time, the stretch rod 26 can be simultaneously retracted when the fill sequence is activated thus increasing the available area for fluid flow into the preform. In some embodiments, stretch rod 26 can be used to first enter the preform to displace air within the preform to facilitate subsequent introduction of fluid. To this end, stretch rod 26 can be simultaneously retracted during introduction of fluid flow to provide an enhanced vacuum pull on fluid introduction. In addition to increasing the fluid path to maximum allowable, this system can also be employed to enter back into the container post fill to accurately set the fill level through a process of volume displacement. Additionally, vents can be placed into the stretch rod midway up its length to allow for venting that can be shut off mid cycle to allow for venting the air contained within a preform prior to filling.

In some embodiments, blow nozzle 22 can be tailored to achieve the benefits of the present teachings. Specifically, in some embodiments, the fluid path within blow nozzle 22 is larger than the preform finish opening at all points. Although, in some embodiments, the fluid path within blow nozzle can be about 10% smaller in diameter than the preform finish opening. However, in some embodiments, the smallest restriction within the entire fluid path from the servo system 60 to the preform 12 is the preform finish inside or inner diameter. In other words, in some embodiments, the minimum inner diameter of the fluid path is greater than a minimum inner diameter of the preform, such that the preform defines the narrowest inner diameter along the entire fluid path.

As described herein, it has been found that by increasing the fill velocity to a rate that permits the container to be formed and filled in less than about 0.4 seconds provides enhanced container quality and improved manufacturing efficiencies. Moreover, in some embodiments, it has been found that combined forming and filling durations of about 0.3 seconds to about 0.2 seconds provide even more improved container quality and manufacturing efficiencies. Structurally, it has been found that this rapid forming and filling process of the present teachings results in improved container structures on a crystalline level. Ideally, it has been found that all container sizes appear to benefit from a forming and filling process being within the range of about 0.05 seconds to about 0.15 seconds.

To this end, at least three distinct areas of interest have been identified to maximize the available area available for fluid transfer through the system. The first distinct area of interest includes the rate of fluid flow, which can be controlled or modified by changing the volume (or generally the cross-sectional area) and fluid pressure. In some embodiments as described herein, the desired fill time is typically less than 300 mS. In order to achieve this threshold, especially when considering applications with small neck finish, e.g. 28 mm, the area opening for the liquid to pass must be optimized. Great care has been made to prevent flow restrictions in the process, so the restricting area becomes the container opening.

In some embodiments that employ the internal stretch rod 26, the diameter of the internal stretch rod 26 can be reduced as much as possible, such as to 8 mm in some embodiments, so as not to interrupt the flow of liquid commodity L into the preform 12. This reduction in the diameter of internal stretch rod 26 is intended, in some embodiments, to minimize the effect of any restriction placed in the flow field. The presence of internal stretch rod 26 within the flow field can reduce the available volume (or cross-sectional area), thereby limiting the available fluid path and reducing the fluid flow rate. The inner components affect on flow can be stated as: Area Finish Opening ($A_{ID}$), Area of interference ($A_{SI}$) and the ratio of the Interference area to the opening, which results in:

$$\text{Available Area \%} = (A_{SI})/(A_{ID}).$$

In some embodiments, Available Area % is preferred to be greater than 80% at neck finish sizes smaller than 30 mm. Testing has shown that containers can be made with less, but this seems to be optimum in some embodiments. However, it should be appreciated that the present teachings provide an available cross-sectional area at the opening of the preform of at least 77%—that is, 77% of the available cross-sectional area of the opening of the preform is available for fluid filling even while stretch rod 26 is disposed within the opening of the preform.

TABLE 1

| Finish (mm) | Inner Component (mm) | Original Available Area (%) | New Available Area (%) | Available Area (mm²) |
|---|---|---|---|---|
| 26 | 8 | 76.95% | 83.78% | 2.596 |
| 38 | 14 | 69.60% | 77.96% | 5.444 |

To improve the fill times, further reduction of the Area of Interference ($A_{SI}$) can be accomplished by further minimizing the stretch rod diameter. Currently, the diameter is limited by the strength of the material—usually Aluminum. However, alternative materials could be used to further reduce the diameter, such as, but not limited to, Carbon Fiber, Titanium alloys, and the like. A 0.1 mm reduction in diameter of internal stretch rod 26 can equate to an increase of 0.13 cm² in area and/or a decrease of 58 cm/sec in liquid velocity, both of which negatively impact flow velocity.

Figure 10:
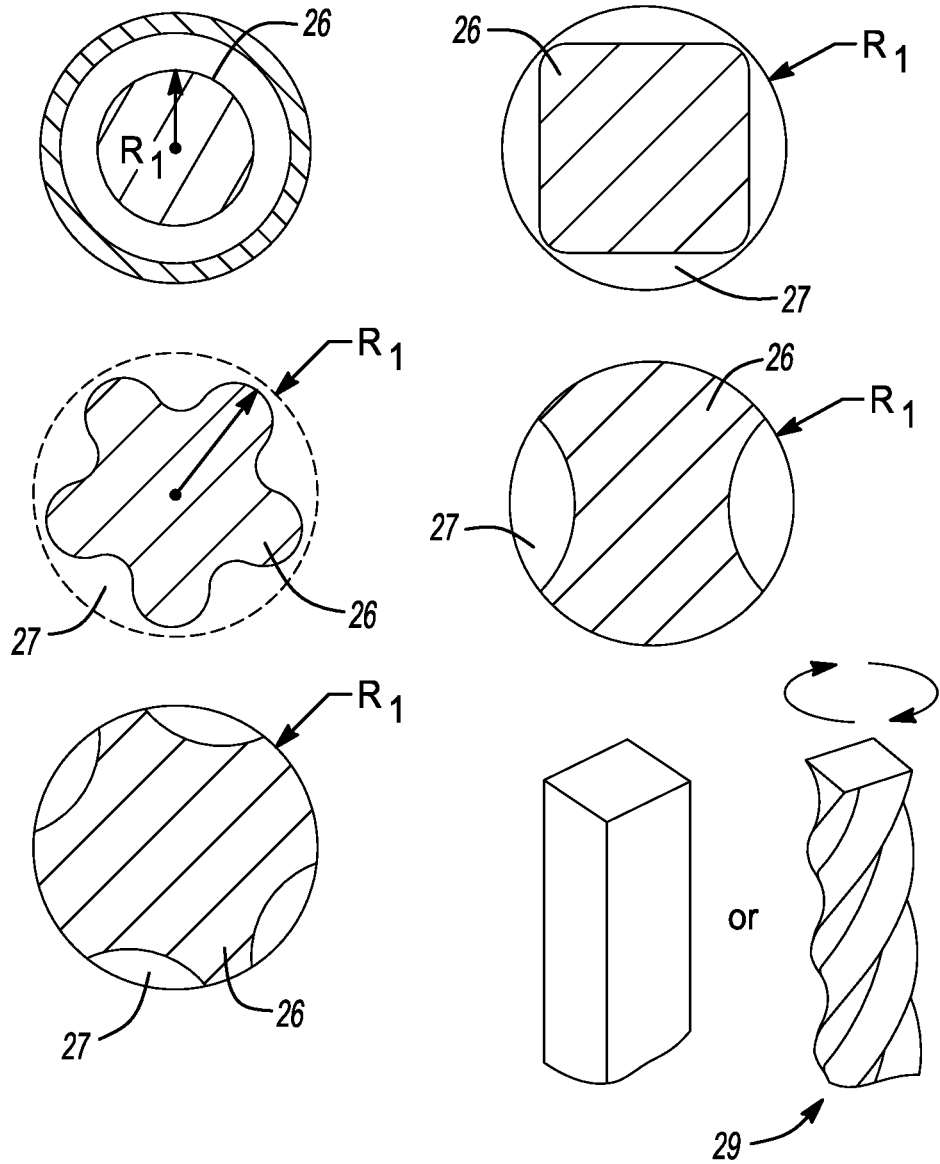
FIG. 10 is a series of schematic cross-sectional depictions of internal stretch rods according to the principles of the present teachings.
Figure 11:
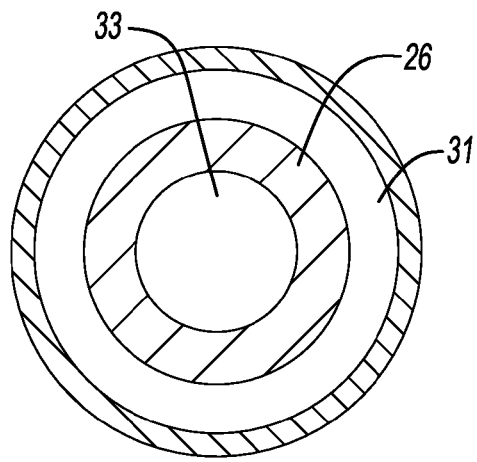
FIG. 11 is a schematic cross-sectional depiction of internal stretch rod having an annulus and internal bore according to the principles of the present teachings.
Figure 12:
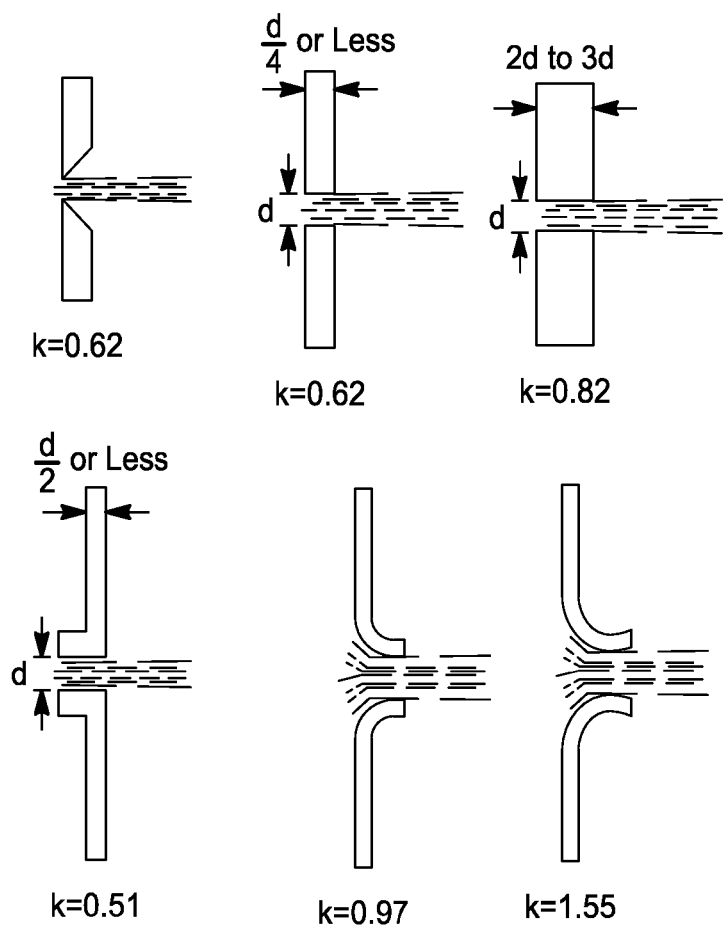
FIG. 12 is a series of schematic cross-sectional depictions illustrating various orifice shapes according to the principles of the present teachings.

As see in FIGS. 10 and 11, alternate shapes of internal stretch rod 26 can be used to increase the available flow area while maintaining the strength of internal stretch rod 26. For example, in some embodiments, internal stretch rod 26 can define a series of arcuate shapes or cutouts 27 formed longitudinally along internal stretch rod 26. In some embodiments, as illustrated in FIG. 10, these longitudinal cutouts can be inwardly directed arcuate sections, straight sections, or generally star-shaped and/or can define a spiral orientation 29 along the length of internal stretch rod 26 or a portion thereof. In this way, an annulus or series of annuli 31 can extend along the sides or internally within internal stretch rod 26 to permit sufficient fluid flow velocity and rate. Moreover, in some embodiments, such as illustrated in FIG. 11, internal stretch rod 26 can comprise an internal bore 33 sufficient to provide additional flow of fluid therethrough. Accordingly, the total flow rate can be the sum of the flow external to internal stretch rod 26 and the flow internal to internal stretch rod 26. Still further, as illustrated in FIG. 12, the orifice shape can further be used to enhance flow velocity.

In one example, the liquid commodity L may be introduced into the plastic container C during a thermal process, typically a hot-fill process. For hot-fill bottling applications, bottlers generally fill the plastic container C with a liquid or product at an elevated temperature between approximately 185° F. to 205° F. (approximately 85° C. to 96° C.) and seal the plastic container C with a closure (not illustrated) before cooling. In one configuration, the liquid may be continuously circulated within the pressure source 20 and/or filling chamber through the inlet 46 whereby the liquid can be heated to a preset temperature (i.e., at a heat source (not illustrated) upstream of the inlet 46). In addition, the plastic container C may be suitable for other high-temperature pasteurization or retort filling processes, or other thermal processes as well. In another example, the liquid commodity L may be introduced into the plastic container C under ambient or cold temperatures. Accordingly, by way of example, the plastic container C may be filled at ambient or cold temperatures such as between approximately 32° F. to 90° F. (approximately 0° C. to 32° C.), and more preferably at approximately 40° F. (approximately 4.4° C.).

Figure 2:
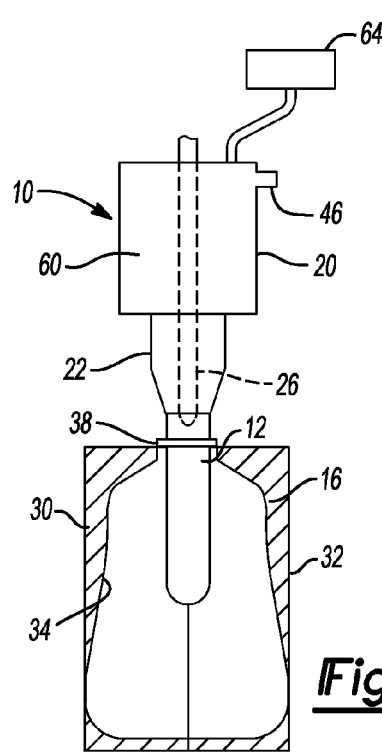
FIG. 2 is a schematic depiction of the system illustrated in FIG. 1 wherein the mold halves close around the preform.

With reference now to all figures, an exemplary method of simultaneously forming and filling the plastic container C will be described. At the outset, the preform 12 may be placed into the mold cavity 16. In one example, a machine (not illustrated) places the preform 12 heated to a temperature between approximately 190° F. to 250° F. (approximately 88° C. to 121° C.) into the mold cavity 16. As the preform 12 is located into the mold cavity 16, the pressure source 20 may begin to draw liquid commodity L into the filling cylinder, manifold or chamber through the inlet 46. The mold halves 30, 32 of the mold cavity 16 may then close thereby capturing the preform 12 (FIG. 2). The blow nozzle 22 may form a seal at a finish of the preform 12. The mold cavity 16 may be heated to a temperature between approximately 250° F. to 350° F. (approximately 93° C. to 177° C.) in order to impart increased crystallinity levels within the resultant container C. In another example, the mold cavity 16 may be provided at ambient or cold temperatures between approximately 32° F. to 90° F. (approximately 0° C. to 32° C.). Liquid commodity L may continue to be drawn into the filling cylinder, manifold or chamber 42 by the piston-like device 40.

Figure 3:
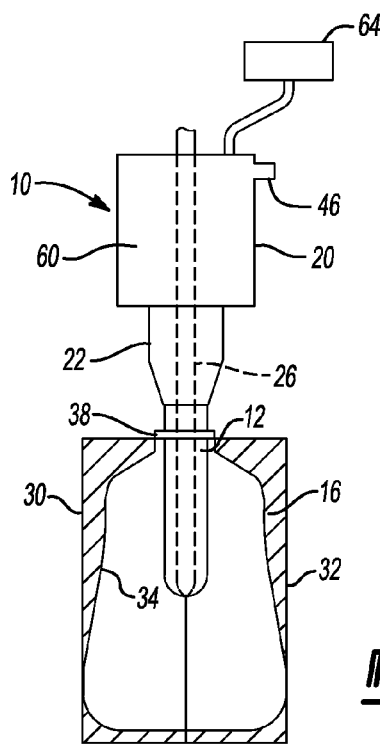
FIG. 3 is a schematic depiction of the system illustrated in FIG. 2 wherein a stretch rod extends into the preform to initiate mechanical stretching and fluid begins to fill the preform cavity.
Figure 4:
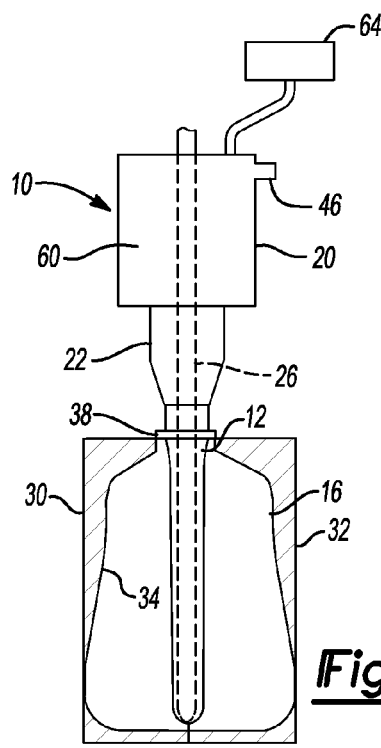
FIG. 4 is a schematic depiction of the system of FIG. 3 wherein the stretch rod stretches the preform and wherein fluid has been fully accumulated in the preform under little to no ambient pressure.

Turning now to FIG. 3, the stretch rod 26 may extend into the preform 12 to initiate mechanical stretching in some embodiments. With reference to FIG. 4, in some embodiments, the stretch rod 26 can continue to stretch the preform 12 thereby thinning the sidewalls of the preform 12. However, as indicated above, the stretch rod 26 can be immediately retracted after initial stretching while fluid flow continues into the preform. The volume of liquid commodity L in the filling cylinder, manifold or chamber may increase until the appropriate volume suitable to form and fill the resultant container C is reached. It should be noted that this can be done at any point in time. Moreover, in some embodiments, liquid commodity L can be imparted into the preform during this stretching phase to prevent the preform from contacting the stretch rod and/or to fill the resultant space with liquid rather than air that must later be displaced during filling. At this point, a valve disposed at the inlet 46 of the pressure source 20 may be closed, if desired.

With specific reference to FIG. 5, the servo system 60 can be actuated to initiate the rapid transfer of liquid commodity L from the filling cylinder, manifold or chamber to the preform 12. In one example, the hydraulic pressure within the preform 12 may reach between approximately 100 PSI to 600 PSI. The liquid commodity L causes the preform 12 to expand toward the interior surface 34 of the mold cavity 16. Residual air may be vented through a passage 70 defined in the stretch rod 26 (FIG. 5). As shown in FIG. 6, the servo system 60 has now completely transferred the appropriate volume of liquid commodity L to the newly formed plastic container C. Next, the stretch rod 26 may be withdrawn from the mold cavity 16, if it has been already. The stretch rod 26 may be designed to displace a predetermined volume of liquid commodity L when it is withdrawn from the mold cavity 16 thereby allowing for the desired fill level of liquid commodity L within the resultant plastic container C and/or the desired headspace.

Alternatively, liquid commodity L can be provided at a constant pressure or at different pressures during the molding cycle. For example, during axial stretching of the preform 12, liquid commodity L may be provided at a pressure which is less than the pressure applied when the preform 12 is blown into substantial conformity with the interior surface 34 of the mold cavity 16 defining the final configuration of the plastic container C. This lower pressure $P_1$ may be ambient or greater than ambient but less than the subsequent high pressure $P_2$. The preform 12 is axially stretched in the mold cavity 16 to a length approximating the final length of the resultant plastic container C. During or just after stretching the preform 12, the preform 12 is generally expanded radially outward under the low pressure $P_1$. This low pressure $P_1$ is preferably in the range of between approximately 100 PSI to 150 PSI and can be held for a predetermined amount of time, such as 0.1 to 0.2 seconds. Subsequently, the preform 12 is further expanded under the high pressure $P_2$ such that the preform 12 contacts the interior surface 34 of the mold halves 30, 32 thereby forming the resultant plastic container C. Preferably, the high pressure $P_2$ is in the range of approximately 500 PSI to 600 PSI and can be held for a predetermined amount of time, such as 0.1 to 0.2 seconds. As a result of the above method, the base and contact ring of the resultant plastic container C is fully circumferentially formed.

With reference to FIG. 7, the fill cycle is shown completed. The mold halves 30, 32 may separate and the blow nozzle 22 may be withdrawn. The resultant filled plastic container C is now ready for post-forming steps such as capping, labeling and packing. At this point, the servo system 60 may begin the next cycle by drawing liquid commodity L through the inlet 46 of the pressure source 20 in preparation for the next fill/form cycle. While not specifically shown, it is appreciated that the mold station 10 may include a controller for communicating signals to the various components. In this way, components such as, but not limited to, the mold cavity 16, the blow nozzle 22, the stretch rod 26, the pressure source 20 and various valves, if employed, may operate according to a signal communicated by the controller. It is also contemplated that the controller may be utilized to adjust various parameters associated with these components according to a given application.

In the exemplary method described herein, the preforms may be passed through an oven in excess of 212° F. (100° C.) and immediately filled and capped. In this way, the opportunity for an empty container to be exposed to the environment where it might become contaminated is greatly reduced. As a result, the cost and complexity of aseptic filling may be greatly reduced.

In some instances where products are hot filled, the package must be designed to accommodate the elevated temperature that it is exposed to during filling and the resultant internal vacuum it is exposed to as a result of the product cooling. A design that accommodates such conditions may require added container weight. Liquid/hydraulic blow molding offers the potential of eliminating the added material required for hot fill process and as a result, lowering the package weight.

The method described herein may be particularly useful for filling applications such as isotonic, juice, tea and other commodities that are susceptible to biological contamination. As such, these commodities are typically filled in a controlled, sterile environment. Commercially, two ways are typically used to achieve the required sterile environment. In Europe, one primary method for filling these types of beverages is in an aseptic filling environment. The filling operation is performed in a clean room. All of the components of the product including the packaging must be sterilized prior to filling. Once filled, the product may be sealed until it is consumed preventing any potential for the introduction of bacteria. The process is expensive to install and operate. As well, there is always the risk of a bacterial contaminant breaking through the operational defenses and contaminating the product.

There are many other bottled products where this technology may be applicable. Products such as dairy products, liquor, household cleaners, salad dressings, sauces, spreads, syrups, edible oils, personal care items, and others may be bottled utilizing such methods. Many of these products are currently in blow molded PET containers but are also in extrusion molded plastic containers, glass bottles and/or cans. This technology has the potential of dramatically changing the economics of package manufacture and filling.

While much of the description has focused on the production of PET containers, it is contemplated that other polyolefin materials (e.g., polyethylene, polypropylene, etc.) as well as a number of other plastics may be processed using the teachings discussed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for simultaneously forming and filling a container comprising:
   a mold cavity defining an internal surface and adapted to accept a preform;
   a servo pressure system having an inlet and an outlet and defining a fluid path from the inlet to the outlet, the servo pressure system outputting fluid; and
   a blow nozzle receiving the fluid from the outlet of the servo pressure source and transferring the fluid at a pressure into an opening of the preform thereby urging the preform to expand toward the internal surface of the mold cavity and creating a resultant container, wherein the fluid remains within the container as an end product,
   wherein a minimum inner diameter of the fluid path is greater than a minimum inner diameter of the preform, and the servo pressure system and the blow nozzle output the fluid at a rate sufficient to fully form and fill the container in less than about 0.5 seconds.

2. The system for simultaneously forming and filling a container according to claim 1 wherein the servo pressure system comprises:
   a controller;
   a servo motor operably coupled to the controller; and
   wherein the servo motor is operable to deliver the fluid at a variable rate along the fluid path within a predetermined period of time.

3. The system for simultaneously forming and filling a container according to claim 2 wherein the fluid path defines a straight path from the inlet to the outlet.

4. The system for simultaneously forming and filling a container according to claim 2 wherein the fluid path is void of angles 90 degrees and greater.

5. The system for simultaneously forming and filling a container according to claim 1 wherein the servo pressure system and the blow nozzle output the fluid at a rate sufficient to fully form and fill the container in less than about 0.4 seconds.

6. The system for simultaneously forming and filling a container according to claim 1 wherein the servo pressure system and the blow nozzle output the fluid at a rate sufficient to fully form and fill the container in less than about 0.2 seconds.

7. The system for simultaneously forming and filling a container according to claim 1 wherein the servo pressure system and the blow nozzle output the fluid at a rate sufficient to fully form and fill the container in the range of about 0.05 seconds to about 0.15 seconds.

8. The system for simultaneously forming and filling a container according to claim 1 wherein the servo pressure system and the blow nozzle output fluid at a rate sufficient to fully form and fill the container having a capacity of 64 ounces in less than about 0.4 seconds.

9. The system for simultaneously forming and filling a container according to claim 1 wherein the servo pressure system and the blow nozzle output the fluid at a rate sufficient to fully form and fill the container having a capacity of 16 ounces in less than about 0.4 seconds.

10. The system for simultaneously forming and filling a container according to claim 1 wherein the blow nozzle defines a shape adapted to form a seal with a finish of the preform.

11. The system for simultaneously forming and filling a container according to claim 1 wherein the fluid is transferred into the preform during a hot-fill process.

12. The system for simultaneously forming and filling a container according to claim 11 wherein the fluid is transferred into the preform at a temperature between approximately 185° F. (85° C.) and approximately 205° F. (96° C.).

13. The system for simultaneously forming and filling a container according to claim 1 wherein the fluid is transferred into the preform at an ambient temperature.

14. The system for simultaneously forming and filling a container according to claim 11 wherein the fluid is transferred into the preform at a temperature between approximately 32° F. (0° C.) and approximately 90° F. (32° C.).

15. The system for simultaneously forming and filling a container according to claim 1 wherein the mold cavity accepts a preform heated to a temperature between approximately 190° F. (88° C.) and approximately 250° F. (121° C.).

16. The system for simultaneously forming and filling a container according to claim 1 wherein the mold cavity is heated to a temperature between approximately 250° F. (93° C.) and approximately 350° F. (177° C.).

17. The system for simultaneously forming and filling a container according to claim 1 wherein the fluid is transferred into the preform at a pressure between approximately 100 PSI and approximately 600 PSI.

18. The system for simultaneously forming and filling a container according to claim 1, further comprising a stretch rod adapted to extend into the container and displace the fluid remaining in the container to define a predetermined final fill level.

19. The system for simultaneously forming and filling a container according to claim 1, further comprising a stretch rod adapted to extend into the preform and displace air contained in the preform prior to the blow nozzle transferring the fluid into the preform.

20. The system for simultaneously forming and filling a container according to claim 1, further comprising a stretch rod adapted to extend into the preform and mechanically stretch the preform prior to the fluid being urged into the preform.

21. The system for simultaneously forming and filling a container according to claim 20, whether the stretch rod is sized to permit the mechanical stretching and to maintain open at least 77% or more of the cross-sectional area of the opening of the preform while the stretch rod is extended into the preform.

22. The system for simultaneously forming and filling a container according to claim 20 wherein the stretch rod is retracted from the preform prior to the fluid being urged into the preform.

23. The system for simultaneously forming and filling a container according to claim 20 wherein the stretch rod is vented to atmosphere.

24. The system for simultaneously forming and filling a container according to claim 20 wherein the stretch rod is non-cylindrical.

25. The system for simultaneously forming and filling a container according to claim 20 wherein the stretch rod comprises one or more cutouts.

26. The system for simultaneously forming and filling a container according to claim 20 wherein the stretch rod comprises an inwardly directed arcuate section.

27. The system for simultaneously forming and filling a container according to claim 20 wherein the stretch rod comprises at least one cutout extending spirally along a longitudinal direction of the stretch rod.

28. The system for simultaneously forming and filling a container according to claim 20 wherein the stretch rod defines an annulus exterior of the stretch rod to permit flow of the fluid.

29. The system for simultaneously forming and filling a container according to claim 20 wherein the stretch rod defines an annulus exterior of the stretch rod to permit flow of the fluid and a bore extending through at least a portion of the stretch rod to further permit flow of the fluid.

30. The system for simultaneously forming and filling a container according to claim 1 wherein the preform is initially expanded outwardly under a first pressure and subsequently expanded outwardly under a second pressure, the second pressure being greater than the first pressure.

31. The system for simultaneously forming and filling a container according to claim 30 wherein the first pressure is between approximately 100 PSI and approximately 150 PSI, and the second pressure is between approximately 500 PSI and approximately 600 PSI.

32. A method of simultaneously forming and filling a container comprising:
    placing a preform into a mold cavity of a mold, the preform having an internal volume, the mold cavity having an internal surface; and
    transferring a fluid via a servo motor system at a pressure into an opening of the preform thereby urging the preform to expand toward the internal surface of the mold cavity by actuating a servo motor in response to the controller such that the fluid is urged into the preform at a variable rate within a predetermined period of time along a fluid path, wherein a minimum inner diameter of the fluid path is greater than a minimum inner diameter of the preform, and creating a resultant container in less than about 0.5 seconds, the fluid remaining within the container as an end product.

33. The method according to claim 32 wherein the transferring a fluid via a servo motor system at a pressure into an opening of the preform comprises: providing a controller; and
    actuating a servo motor in response to the controller such that the fluid is urged into the preform at a variable rate within a predetermined period of time along a fluid path.

34. The method according to claim 32 wherein the transferring a fluid via a servo motor system at a pressure into an opening of the preform comprises: providing a controller; and
    actuating a servo motor in response to the controller such that the fluid is urged into the preform at a variable rate within a predetermined period of time along a fluid path, wherein the fluid path extends from an input of the servo motor system to an output of the servo motor system and the fluid path is substantially straight.

35. The method according to claim 32 wherein the step of transferring a fluid via a servo motor system at a pressure into an opening of the preform thereby urging the preform to expand toward the internal surface of the mold cavity and creating a resultant container in less than about 0.5 seconds comprises transferring the fluid via the servo motor system at the pressure into the opening of the preform thereby urging the preform to expand toward the internal surface of the mold cavity and creating the resultant container in less than about 0.4 seconds.

36. The method according to claim 32 wherein the step of transferring a fluid via a servo motor system at a pressure into an opening of the preform thereby urging the preform to expand toward the internal surface of the mold cavity and creating a resultant container in less than about 0.5 seconds comprises transferring the fluid via the servo motor system at the pressure into the opening of the preform thereby urging the preform to expand toward the internal surface of the mold cavity and creating the resultant container in less than about 0.2 seconds.

37. The method according to claim 32 wherein the step of transferring a fluid via a servo motor system at a pressure into an opening of the preform thereby urging the preform to expand toward the internal surface of the mold cavity and creating a resultant container in less than about 0.5 seconds comprises transferring the fluid via the servo motor system at the pressure into the opening of the preform thereby urging the preform to expand toward the internal surface of the mold cavity and creating the resultant container in the range of about 0.05 seconds to about 0.15 seconds.

38. The method according to claim 32 wherein the step of transferring a fluid via a servo motor system at a pressure into an opening of the preform thereby urging the preform to expand toward the internal surface of the mold cavity and creating a resultant container in less than about 0.5 seconds comprises transferring the fluid via the servo motor system at the pressure into the opening of the preform thereby urging the preform to expand toward the internal surface of the mold cavity and creating the resultant container having a capacity of about 64 ounces in less than about 0.4 seconds.

39. The method according to claim 32 wherein the step of transferring a fluid via a servo motor system at a pressure into an opening of the preform thereby urging the preform to expand toward the internal surface of the mold cavity and creating a resultant container in less than about 0.5 seconds comprises transferring the fluid via the servo motor system at the pressure into the opening of the preform thereby urging the preform to expand toward the internal surface of the mold cavity and creating the resultant container having a capacity of about 16 ounces in less than about 0.4 seconds.

40. The method according to claim 32 wherein the step of transferring a fluid via a servo motor system at a pressure into an opening of the preform thereby urging the preform to expand toward the internal surface of the mold cavity and creating a resultant container in less than about 0.5 seconds comprises transferring the fluid as a hot-fill process.

41. The method according to claim 32 wherein the step of transferring a fluid via a servo motor system at a pressure into an opening of the preform thereby urging the preform to expand toward the internal surface of the mold cavity and creating a resultant container in less than about 0.5 seconds comprises transferring the fluid at a temperature between approximately 185° F. (85° C.) and approximately 205° F. (96° C.).

42. The method according to claim 32 wherein the step of transferring a fluid via a servo motor system at a pressure into an opening of the preform thereby urging the preform to expand toward the internal surface of the mold cavity and creating a resultant container in less than about 0.5 seconds comprises transferring the fluid at ambient temperature.

43. The method according to claim 32 wherein the step of transferring a fluid via a servo motor system at a pressure into an opening of the preform thereby urging the preform to expand toward the internal surface of the mold cavity and creating a resultant container in less than about 0.5 seconds comprises transferring the fluid at a temperature between approximately 32° F. (0° C.) and approximately 90° F. (32° C.).

44. The method according to claim 32 wherein the step of placing
  a preform into a mold cavity of a mold comprises heating the preform to a temperature between approximately 190° F. (88° C.) and approximately 250° F. (121° C.) and placing the preform into the mold cavity of the mold.

45. The method according to claim 32 wherein the step of transferring a fluid via a servo motor system at a pressure into an opening of the preform thereby urging the preform to expand toward the internal surface of the mold cavity and creating a resultant container in less than about 0.5 seconds comprises transferring the fluid into the preform at a pressure between approximately 100 PSI and approximately 600 PSI.

46. The method according to claim 32, further comprising: extending a stretch rod into the resultant container and displacing the fluid remaining in the resultant container to define a predetermined final fill level.

47. The method according to claim 32, further comprising:
  extending a stretch rod into the preform and displacing air contained within the preform prior to the step of transferring the fluid via the servo motor system at the pressure into the opening of the preform.

48. The method according to claim 32, further comprising:
  extending a stretch rod into the preform and mechanically stretching the preform prior to the step of transferring the fluid via the servo motor system at the pressure into the opening of the preform.

49. The method according to claim 32, further comprising:
  extending a stretch rod into the preform and mechanically stretching the preform; and
  retracting the stretch rod from the preform prior to the step of transferring the fluid via the servo motor system at the pressure into the opening of the preform.

50. The method according to claim 32, further comprising:
  extending a stretch rod into the preform and mechanically stretching the preform prior to the step of transferring the fluid via the servo motor system at the pressure into the opening of the preform, the stretch rod being sized to maintain open at least 77% or more of the cross-sectional area of an opening of the preform while the stretch rod is extended into the preform.

51. The method according to claim 32, further comprising:
  extending a stretch rod into the preform and mechanically stretching the preform prior to the step of transferring the fluid via the servo motor system at the pressure into the opening of the preform, the stretch rod being non-cylindrical.

52. The method according to claim 32, further comprising:
  extending a stretch rod into the preform and mechanically stretching the preform prior to the step of transferring the fluid via the servo motor system at the pressure into the opening of the preform, the stretch rod having one or more cutouts.

53. The method according to claim 32, further comprising:
  extending a stretch rod into the preform and mechanically stretching the preform prior to the step of transferring the fluid via the servo motor system at the pressure into the opening of the preform, the stretch rod having an inwardly directed arcuate section.

54. The method according to claim 32, further comprising:
  extending a stretch rod into the preform and mechanically stretching the preform prior to the step of transferring the fluid via the servo motor system at the pressure into the opening of the preform, the stretch rod having at least one cutout extending spirally along a longitudinal direction of the stretch rod.

55. The method according to claim 32, further comprising:
  extending a stretch rod into the preform and mechanically stretching the preform prior to the step of transferring the fluid via the servo motor system at the pressure into the opening of the preform, the stretch rod having an annulus exterior of the stretch rod to permit flow of the fluid.

56. The method according to claim 32, further comprising:
  extending a stretch rod into the preform and mechanically stretching the preform prior to the step of transferring the fluid via the servo motor system at the pressure into the opening of the preform, the stretch rod having an annulus exterior of the stretch rod to permit flow of the fluid and a bore extending through at least a portion of the stretch rod to further permit flow of the fluid.

57. The method according to claim 32 wherein the transferring a
  fluid via the servo motor system at the pressure into the opening of the preform comprises transferring the fluid at a first pressure and subsequently at a second pressure, the second pressure being greater than the first pressure.

\* \* \* \* \*